United States Patent [19]

Peruth

[11] Patent Number: 4,740,880
[45] Date of Patent: Apr. 26, 1988

[54] BLOCKING OSCILLATOR-SWITCHED POWER SUPPLY WITH PEAK CURRENT REDUCTION CIRCUITRY

[75] Inventor: Günther Peruth, Munich, Fed. Rep. of Germany

[73] Assignee: Siemens Aktiengesellschaft, Berlin and Munich, Fed. Rep. of Germany

[21] Appl. No.: 920,239

[22] Filed: Oct. 17, 1986

[30] Foreign Application Priority Data

Oct. 17, 1985 [DE] Fed. Rep. of Germany ....... 3537057

[51] Int. Cl.⁴ .......................................... H02M 3/335
[52] U.S. Cl. ..................................... 363/131; 363/21; 363/49
[58] Field of Search ....................... 363/19, 20, 21, 49, 363/131

[56] References Cited

U.S. PATENT DOCUMENTS

| | | | |
|---|---|---|---|
| 4,063,307 | 12/1977 | Stephens | 363/49 |
| 4,208,705 | 6/1980 | Hosoya | 363/49 |
| 4,361,865 | 11/1982 | Shono | 363/49 |
| 4,450,514 | 5/1984 | Peruth | 363/49 |
| 4,459,651 | 7/1984 | Fenter | 363/49 |

FOREIGN PATENT DOCUMENTS 3312209 10/1984 Fed. Rep. of Germany .
3347930 8/1985 Fed. Rep. of Germany .

Primary Examiner—Patrick R. Salce
Assistant Examiner—Jeffrey Starrett
Attorney, Agent, or Firm—Herbert L. Lerner; Laurence A. Greenberg

[57] ABSTRACT

A circuit for reducing peak current in dependence on line voltage in a blocking oscillator-switched power supply, includes a transformer having a primary winding and a control winding, an electronic switch connected in series with the primary winding, and a control circuit supplied by the control winding for controlling the electronic switch, the control circuit including a pulse processing stage addressed by rectified a-c line voltage fed into the primary winding, a start-up stage, and a variable voltage coupling stage coupling the pulse-processing stage to the start-up stage.

2 Claims, 1 Drawing Sheet

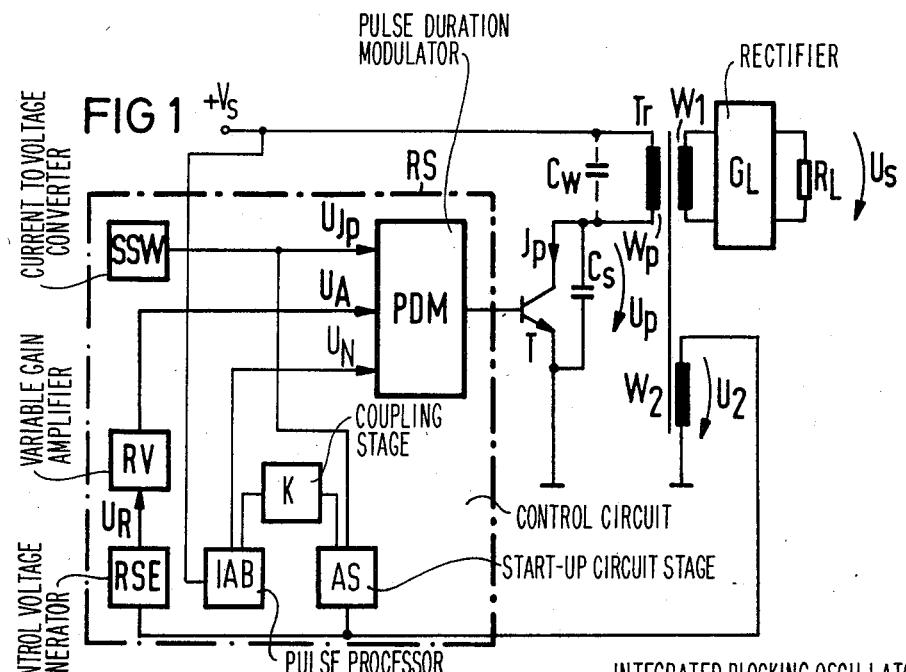
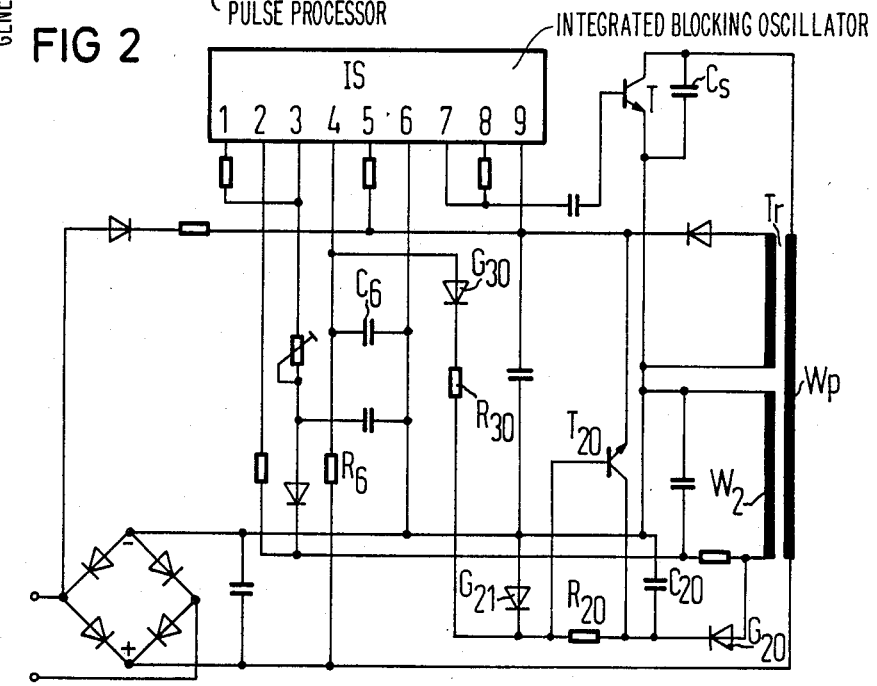

BLOCKING OSCILLATOR-SWITCHED POWER SUPPLY WITH PEAK CURRENT REDUCTION CIRCUITRY

BACKGROUND OF THE INVENTION

1. Field of the Invention:

The invention relates to a circuit for reducing peak current in dependence on or as a function of line voltage in a blocking oscillator-switched power supply, including a transformer having a primary winding and a control winding, the primary winding being connected in series with an electronic switch, and the control winding supplying a control circuit for controlling the electronic switch, the control circuit including a pulse processing stage and a start-up stage.

2. Description of Related Art:

Blocking oscillator-switched power supplies which are suited for a circuit of the type under discussion are known, for instance, from German Published, Non-Prosecuted Applications DE-OS Nos. 33 47 930 and 33 12 209, the latter corresponding to U.S. Pat. No. 4,593,347. Such blocking oscillator-switched power supplies have a wide control range for a-c line voltage from 90 to 270 V. Besides the constance of the secondary voltage in the case of secondary load variations and primary network voltage variations, protection against overloads and short circuits is to be assured over the entire voltage range.

Protective measures known to date are accomplished either through a voltage monitoring system on the secondary side or through current monitoring on the primary side. In order to obtain the necessary useful power, the current limit must be larger than the maximum current obtained for the minimum voltage, due to the magnetic saturation of the transformer of the switched power supply. If a control range in the order of the voltage limits of 90 to 270 V given above is to be assured, a voltage ratio of 3:1 is obtained, which results in the correspondingly high volume of the power limit. The maximum current value therefore leads to a considerable overload over the entire voltage range, which in individual cases can even lead to destruction. This can only be counteracted with certainty by providing a greatly overdesigned transformer and by tolerating poor efficiency at low voltages. In addition, other components must be overdesigned for the protection of such a blocking oscillator-switched power supply.

SUMMARY OF THE INVENTION

It is accordingly an object of the invention to provide a circuit which overcomes the hereinafore-mentioned disadvantages of the heretofore-known devices of this general type and in which the above-mentioned overdesign which is necessary in the prior art for safety reasons, is not required.

With the foregoing and other objects in view there is provided, in accordance with the invention, a circuit for reducing peak current in dependence on or as a function of line voltage in a blocking oscillator-switched power supply, comprising a transformer having a primary winding and a control winding, an electronic switch connected in series with the primary winding, and a control circuit supplied by the control winding for controlling the electronic switch, the control circuit including a pulse processing stage addressed by rectified a-c line voltage fed into the primary winding, a start-up stage, and a variable voltage coupling stage coupling the pulse-processing stage to the start-up stage.

In accordance with a concomitant feature of the invention, the coupling stage is formed by a series circuit of a Zener diode and a resistor.

Other features which are considered as characteristic for the invention are set forth in the appended claims.

Although the invention is illustrated and described herein as embodied in a circuit for reducing the peak current in a blocking oscillator-switched power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a schematic and block circuit diagram of the basic structure of a blocking oscillator-switched power supply with a circuit according to the invention; and FIG. 2 is a detailed circuit diagram of a blocking oscillator-switched power supply with a concrete embodiment of a circuit according to the invention.

DESCRIPTION OF THE PREFERRED EMBODIMENTS

Referring now to the figures of the drawings in detail and first, particularly, to FIG. 1 thereof, there is seen a circuit diagram including the basic construction of a blocking oscillator-switched power supply which is known, for instance, from German Published, Non-Prosecuted Application DE-OS No. 33 12 209, corresponding to U.S. Pat. No. 4,593,347. The circuit includes a power transistor T which serves as a control element and is connected with its emitter-collector path in series with a primary winding Wp of a transformer Tr. A d-c voltage $+V_s$ operating the series circuit is obtained by rectification of the a-c line voltage. If an npn-transistor is used as the switch T, the emitter thereof is at reference potential; the collector is connected to the primary winding Wp of the transformer Tr, and the other end of the primary winding Wp is connected to the voltage $+V_s$. The emitter-collector path of the transistor T is bridged or shunted by a capacitor $C_s$, while a parasitic capacity $C_w$ is connected across the primary winding Wp. The transistor T is driven at its base by a control circuit RS which is yet to be described.

A first secondary winding $W_1$ of the transformer Tr forms the secondary side proper of the switched power supply transformer Tr which supplies electrical equipment through a rectifier $G_L$. The electrical equipment is schematically indicated by its load $R_L$ which receives a secondary voltage $U_s$.

A second secondary winding $W_2$ of the transformer Tr serves as a sensor for the control circuit RS and is connected with one end thereof to a reference potential and with the other end thereof to the input of the control circuit RS.

The control circuit RS contains an output circuit part PDM which controls the transistor T and is constructed as a pulse width modulator, as well as two input circuit parts controlled by the sensor winding $W_2$. One input circuit part RSE serves for generating a control voltage $U_R$ and furnishes a control signal $U_A$ for the pulse width modulator PDM through a control amplifier RV. A further input circuit part AS represents a start-up circuit stage, providing a switch-on aid which assures a reliable start of the switched power supply after switching-on and which subsequently switches itself off. Such a start-up aid is known from German Published, Non-Prosecuted Application DE-OS No. 33 47 930.

A further stage IAB known from German Published, Non-Prosecuted Application DE-OS No. 33 12 209 and U.S. Pat. No. 4,593,347 mentioned above, serves for pulse processing and furnishes a signal $U_N$ for the pulse width modulator PDM of the control circuit RS. There is furthermore provided a current-voltage converter SSW which forms the actual-value control of the control circuit and furnishes a voltage $UJ_p$ proportional to the primary current for the pulse width modulator PDM, which is designated with reference symbol $j_p$.

According to the invention, on one hand, a coupling stage K is provided between the pulse processing stage IAB and the start-up circuit stage AS, and on the other hand, the pulse processing stage IAB is addressed by the primary voltage $+Vs$ and not by the winding $W_2$, as is done according to German Published, Non-Prosecuted Application DE-OS No. 33 12 209 and U.S. Pat. No. 4,593,347.

In the pulse processing stage IAB, a ramp-shaped or inclined pulse signal is formed between two reference voltages as a function of a voltage Vs; the pulse signal has a certain relationship to a primary inductivity Wp. A change of the voltage Vs is accompanied by a change in the primary current $j_p$ through the primary winding Wp as well as a change in the ramp between the reference voltages in the pulse processing stage IAB. The change of the slope of the current in the primary winding Wp and of the ramp in the pulse processing stage as a function of the voltage Vs, is constant.

The coupling stage K according to the invention assures that the slope of the ramp in the pulse processing stage IAB rises faster as a function of the voltage Vs than the slope of the current in the primary winding Wp.

Due to the coupling stage K between the pulse processing stage IAB and the start-up circuit stage AS which has a power supply that is in a linear relationship to the voltage Vs, the ramp change is more than proportional. It is therefore possible to reduce the peak peak current in the transistor T from a maximum value at the minimum voltage Vs to a minimum value at the maximum voltage Vs by a factor of 2 to 3. The secondary load curve therefore becomes independent of the rectified line voltage Vs, over the entire control range of the a-c line voltage.

FIG. 2 shows a concrete embodiment of a circuit according to the invention for a blocking oscillator-switched power supply, as is known in principle from German Published, Non-Prosecuted Applicatin DE-OS No. 30 32 034, corresponding to U.S. Pat. No. 4,450,514. Therefore, an explanation will only be given concerning the circuit parts of FIG. 2 which are essential for an understanding of the circuit according to the invention.

In the circuit according to FIG. 2, the pulse processing stage IAB according to FIG. 1 is formed by an integrated blocking oscillator IS together with an RC member $R_6$, $C_6$. The start-up circuit stage AS according to FIG. 1 is formed by components $T_{20}$, $R_{20}$, $C_{20}$, $G_{20}$ and $G_{21}$, as is known in principle from German Published, Non-Prosecuted Application DE-OS No. 33 47 930.

According to one embodiment of the invention, a series circuit of a Zener diode $G_{30}$ and a resistor $R_{30}$ is provided as the coupling circuit. In this manner it becomes possible to determine the set-in point of the voltage of the ramp correction through the choice of a constant voltage dropping across the Zener diode $G_{30}$ and to determine the magnitude of the ramp correction through the choice of the value of the resistor R30.

It should be pointed out that in the switched power supply according to FIG. 1 as well as in that according to FIG. 2, the pulse processing stage IAB as well as the start-up circuit stage AS are supplied from separate windings of the transformer Tr, in particular from the primary winding Wp and the control winding $W_2$, respectively, The foregoing is a description corresponding in substance to German Application No. P 35 37 057.2, dated Oct. 17, 1985, the International priority of which is being claimed for the instant application, and which is hereby made part of this application. Any material discrepancies between the foregoing specification and the aforementioned corresponding German application are to be resolved in favor of the latter.

I claim:

1. Circuit for reducing peak current in dependence on line voltage in a blocking oscillator-switched power supply, comprising a transformer having a primary winding and a control winding, an electronic switch connected in series with said primary winding, and a control circuit supplied by said control winding for controlling said electronic switch, said control circuit including a pulse processing stage addressed by rectified a-c line voltage fed into said primary winding, a start-up stage, and a variable voltage coupling stage coupling said pulse-processing stage to said start-up stage.

2. Circuit according to claim 1, wherein said coupling stage is formed by a series circuit of a Zener diode and a resistor.

* * * * *